(12) United States Patent
Kim

(10) Patent No.: US 8,751,142 B2
(45) Date of Patent: Jun. 10, 2014

(54) METHOD FOR AVOIDING SIDE COLLISION OF VEHICLES

(76) Inventor: Eun-sook Kim, Seoul (KR)

(*) Notice: Subject to any disclaimer, the term of this patent is extended or adjusted under 35 U.S.C. 154(b) by 278 days.

(21) Appl. No.: 13/298,791

(22) Filed: Nov. 17, 2011

(65) Prior Publication Data

US 2012/0130629 A1     May 24, 2012

(30) Foreign Application Priority Data

Nov. 18, 2010   (KR) .................. 10-2010-0114851

(51) Int. Cl.
    *G08G 1/16*      (2006.01)

(52) U.S. Cl.
    USPC ............................... 701/301; 701/45; 701/79

(58) Field of Classification Search
    USPC .......... 701/45, 70, 79, 93, 117, 300, 301, 302
    See application file for complete search history.

(56) References Cited

U.S. PATENT DOCUMENTS

| | | | | |
|---|---|---|---|---|
| 7,986,261 B2* | 7/2011 | Harada | ........................ | 342/107 |
| 2004/0181338 A1* | 9/2004 | Dobler et al. | ................. | 701/301 |
| 2009/0099728 A1* | 4/2009 | Ichinose et al. | ................. | 701/39 |
| 2010/0300794 A1* | 12/2010 | Stabrey | ........................ | 180/275 |
| 2012/0235853 A1* | 9/2012 | Takeuchi | ........................ | 342/71 |
| 2013/0179047 A1* | 7/2013 | Miller et al. | ................... | 701/70 |
| 2013/0218416 A1* | 8/2013 | Shirato | ........................... | 701/42 |

FOREIGN PATENT DOCUMENTS

| JP | 2010-055333 | 3/2010 |
|---|---|---|
| KR | 2000-0067001 | 11/2000 |

* cited by examiner

*Primary Examiner* — Jason Holloway
(74) *Attorney, Agent, or Firm* — Patterson Thuente Pedersen, P.A.

(57) ABSTRACT

A method for avoiding side collision of vehicles at cross roads (where two or more roads meet) by utilizing a side collision prediction algorithm. The method for avoiding side collision of vehicles includes the steps of controlling the movement of the vehicle that is compliant with the traffic light and has started moving, by either rapid acceleration or deceleration when the driver of a first vehicle is unable to promptly respond to a second vehicle approaching from the side (left to right or right to left) in violation of the traffic light signal, or in cases where a collision is unavoidable, by causing the collision to occur as far away from the occupant compartment of the first vehicle as possible to minimize any injuries of the passengers in the first vehicle.

7 Claims, 7 Drawing Sheets

METHOD FOR AVOIDING SIDE COLLISION OF VEHICLES

RELATED APPLICATION

This application claims the benefit of Republic of Korea Patent Application No. 10-2010-0114851, filed Nov. 18, 2010, now Republic of Korea Patent No. 10-1029096, issued Apr. 6, 2011, which is incorporated herein in its entirety by reference.

FIELD OF THE INVENTION

This invention relates to a method of avoiding a side collision of vehicles that utilizes an algorithm that predicts the area of side collisions at crossroads (where two roads meet or cross). In particular, the invention relates to a method for avoiding side collision of vehicles by controlling the movement of the vehicle that is compliant with the traffic light (hereinafter, Vehicle A) that has started moving, by either rapid acceleration or deceleration when the driver of Vehicle A is unable to promptly respond to a vehicle approaching from the side (left to right or right to left) in violation of the traffic light signal, or in cases where a collision is unavoidable, by causing the collision to occur as far away from the occupant compartment of Vehicle A in order to minimize any injuries of the passengers of Vehicle A.

BACKGROUND OF THE INVENTION

As shown by FIG. 1, side collisions at crossroads are one of the most fatal types of accidents for passengers of the vehicle that is hit from the side. Accordingly, there is an urgent need to develop a technology that can reduce this type of fatality.

In particular, because the colliding vehicle approaches from the side in collisions involving crossroads, frequently the driver and the passengers of the vehicle being hit are unable to see the colliding vehicle.

Although side impact airbags are used to minimize injuries caused by side collisions, due to the structure of the automobile, there is a limit on how much crumple zone can be built in to minimize the impact of side collisions.

Generally, the conventional collision prevention systems installed in vehicles, such as BWS (Back Warning System) and CWS (Collision Warning System) are only capable of generating collision prevention information by detecting objects around the vehicle in a single direction. Accordingly, they are able to only detect a limited range of area for objects. Additionally, they were not capable of taking any active measures to prevent collision but are only able to provide warning.

SUMMARY OF THE INVENTION

The technology in this patent application was devised to solve these shortcomings of conventional vehicle collision prevention systems.

As shown in FIGS. 2 and 3, conventional vehicle collision prevention systems work as follows: The main control unit 30 using a speed sensor 20 determines whether the speed detection signal exceeds a standard (for example, exceeds 20 km/h) S10, and if the speed of the vehicle exceeds 20 km/h, by reading the location signals of the radar sensor 10, which detects objects all around the vehicle (360° around the vehicle), determines S12 whether there is any object within the predetermined safety range of the traveling vehicle.

If the objects are located at safe distances away from the vehicle, the main control unit 30 repeats S10 stage and S12 stage. But if there are objects that are too close to the vehicle, the information is expressed as a warning 60 S14, generating an alarm sound.

When the alarm sound is generated, the main control unit 30 reads the location signal generated by the radar sensor 10 and determines whether any of the objects close to the vehicle is located to the front of the vehicle S16.

If it is determined that the object close to the vehicle is located to the front of the vehicle, the main control unit 30 generates a deceleration signal detected by the brake system controller 40, causing the vehicle to decelerate to actively prevent S18 a collision accident between the vehicle and the object in front of the vehicle.

If it is determined that the object close to the vehicle is not located to the front of the vehicle, the main control unit 30 generates an acceleration signal detected by the acceleration controller 50, causing the vehicle to accelerate to actively prevent a collision between the vehicle and the object not located to the front of the vehicle (particularly if the object is located to the rear of the vehicle) S20.

However, the conventional collision avoidance technologies determine the presence of objects around the vehicle in terms of safety boundary (radar sensor only detects objects within this range). Accordingly, the safety distance changes in real time depending on the approaching speed of the nearby object (in other words, approaching vehicle) and the approaching direction, meaning that they are not able to fulfill their function of avoiding vehicle collisions in an accurate manner.

In particular, this is when Vehicle A and the approaching vehicle (hereinafter Vehicle B) are both traveling at above-normal speeds. Because it is difficult to measure the exact speed at the moment and the direction of an approaching vehicle, calculating the collision spot in an accurate manner is difficult.

This invention, in order to solve the above-discussed problem, relates to a method of avoiding side collisions for vehicles that minimizes damages by precisely predicting the collision spot at a crossroads (place where roads meet).

In order to solve the above-discussed problem, the invention's method of avoiding side collisions of vehicles includes, a stage in which it is determined whether Vehicle A is stopped at a crossroads; if Vehicle A is stopped at a crossroads, a stage in which the crossroads information is displayed; a stage to determine if Vehicle A has started moving; a stage in which, if Vehicle A starts to move, it is determined whether Vehicle B is approaching towards the side of Vehicle A by utilizing radar; a stage in which, if approaching Vehicle B is detected, a warning is given to the driver of Vehicle A and, if not detected, Vehicle A is normally operated; a stage in which a warning is given to the driver of Vehicle A and then the time ($T_B$) it takes for approaching Vehicle B to reach the anticipated collision location (X) is calculated by using the speed ($V_B$), acceleration ($a_B$), distance (S) and direction ($\theta$) as measured by radar; a stage in which the distance ($L_A$) travelled by Vehicle A during the time ($T_B$) by using the speed ($V_A$) and acceleration ($a_A$) is calculated; a stage in which it is determined whether Vehicle B will collide with Vehicle A by using the time ($T_B$) and the distance ($L_A$); if a collision is predicted, a stage in which it is determined whether Vehicle B will strike Vehicle A in the front half, and rapidly decelerating Vehicle A if it is determined that the impact will be in the front half of Vehicle A, or rapidly accelerating Vehicle A if it is determined that the impact will not be in the front half of Vehicle A (in other words, the impact will be in the rear half of Vehicle B); and a stage in which the alarm is deactivated and Vehicle A is operated in a normal manner after the abovementioned rapid deceleration or rapid acceleration.

The method of avoiding side collisions of vehicles as described, wherein the abovementioned direction (θ) represents the angle between the location of Vehicle B when detected and Vehicle A' direction of movement when the collision is to occur at a substantially perpendicular angle. In such a case, the distance ($L_{AX}$), representing the distance between the location of Vehicle A at the time when Vehicle B is detected and the anticipated collision location (X) is calculated via S×cos θ; and the distance ($L_{BX}$), representing the distance between the point where Vehicle B is detected and the anticipated collision location (X) is calculated via S×sin θ.

The method of avoiding side collisions of vehicles as described, wherein the abovementioned direction (θ) equals angle ($θ_1$), which represents the angle between the location Vehicle B when detected and Vehicle A's direction of movement, and angle ($θ_2$), represents the angle between Vehicle B's direction of movement and a line perpendicular to Vehicle A's direction of movement if the collision is to occur at a non-perpendicular angle. In such case, the distance the distance ($L_{AX}$), representing the distance between the location of Vehicle A at the time when Vehicle B is detected and the anticipated collision location (X) is calculated via S×cos $θ_1$+ (S×sin $θ_1$×tan $θ_2$); and the distance ($L_{BX}$), representing the distance between the point where Vehicle B is detected and the anticipated collision location (X) is calculated via S×sin $θ_1$/cos $θ_2$.

The method of avoiding side collisions of vehicles as described wherein, the time ($T_B$), which represents the time it takes for Vehicle B to travel from the point where it is detected to the anticipated collision location (X) is calculated by using the formula $L_{BX}=V_B×T_B+½×a_B×T_B^2$. Additionally, the distance ($L_A$), which represents the distance travelled by Vehicle A during the time ($T_B$) is calculated by using the formula $L_A=V_A×T_B+½×a_A×T_B^2$.

The method of avoiding side collisions of vehicles as described, wherein it is determined whether a collision will occur between Vehicle A and Vehicle B when the difference between $L_A$ and $L_{AX}$ is shorter than the length of Vehicle A. When determined that collision will occur, Vehicle A should be rapidly decelerated if $L_A<L_{AX}$ (because there will be a collision with the front half of vehicle A), or Vehicle A should be rapidly accelerated if $L_A>L_{AX}$ (because there will be a collision with the rear half of Vehicle A).

As has been made clear by the above description, an ideal embodiment of the method of avoiding side collisions of vehicles according to this invention will have the following effects.

The collision spot (X) of Vehicle A and Vehicle B is predicted by measuring the speed, acceleration, distance and direction using a radar and then by calculating with precision the time ($T_B$) it takes for Vehicle B to travel to the anticipated collision location, and the distance Vehicle A travels during that time. Based on the results, Vehicle A is either rapidly accelerated or decelerated to avoid the collision, or at least cause the impact to occur on the front (engine compartment) or the rear (trunk) areas of Vehicle A, avoiding occupant compartments, and thereby minimizing injuries to passengers of Vehicle A.

DETAILED DESCRIPTION OF THE DRAWINGS

Below, an embodiment of this invention is described in detail using the attached figures. For elements that are identical to the elements in the prior art, identical symbols are utilized and no detailed description is given. Additionally, "crossroads" as used in this invention include not only perpendicular crossroads but any instances where two or more roads intersect; accordingly this Invention is effective not only for perpendicular collisions but also for non-perpendicular collisions.

To illustrate, a driver at a perpendicular crossroads behaves as follows: whenever a driver approaches a crossroads when the traffic light is about to change, he or she faces a dilemma. The driver has to guess about the possibilities of going through the crossroads when the light changes from green to yellow but before the red light comes on. The yellow light is normally maintained for three seconds. An accident can occur when the driver does not slow or stop but decides to drive through the crossroads, and the light changes to red. Statistically the average speed at which an automobile approaching a crossroads on a two-to-three lane road is between 50 to 60 km/h. In this example, Vehicle B, travelling on a six-lane crossroads (counting both directions), from left to right, runs through the red light causing a potential accident.

Figure 5:
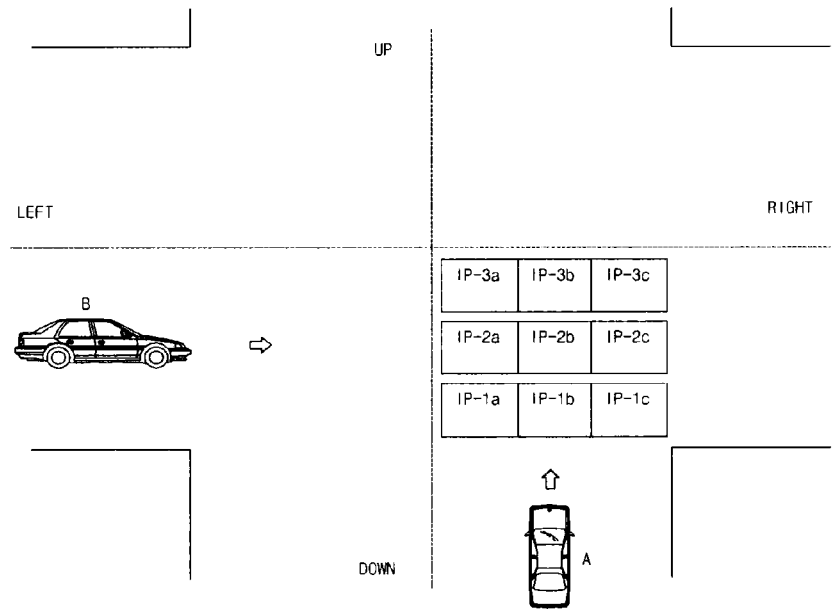
FIG. 5 depicts the situational diagram at the moment of detection.

As shown in FIG. 5, Vehicle B approaches from the left and Vehicle A, which obeys the traffic light, starts moving from the bottom to the top. Additionally, based on the driver's field of vision, it is assumed that the vehicles recognize each other when they have already passed the crosswalks and entered the crossroads. Then, depending on the lanes travelled by the vehicles, there are nine impact positions (IP). For example, if both vehicles were traveling on lane 2, their collision would take place at IP-2b. Then, by controlling the movement of Vehicle A to avoid both cars from entering IP-2b at the same time, collision can be avoided or collision damages can be minimized.

Figure 6:
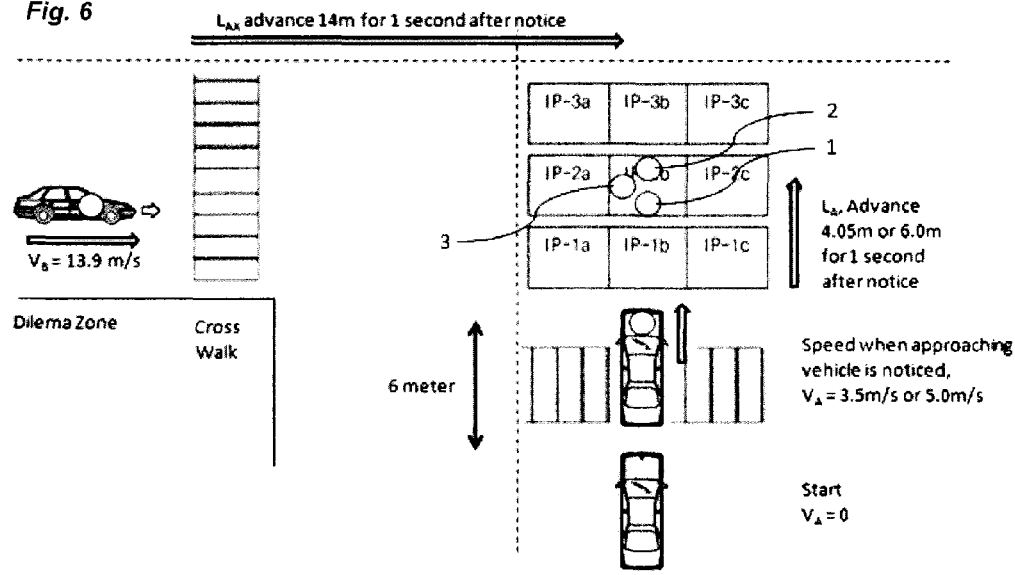
FIG. 6 depicts the situation where a vehicle running the red light is approaching from the left in a six-lane crossroads.
Figure 7:
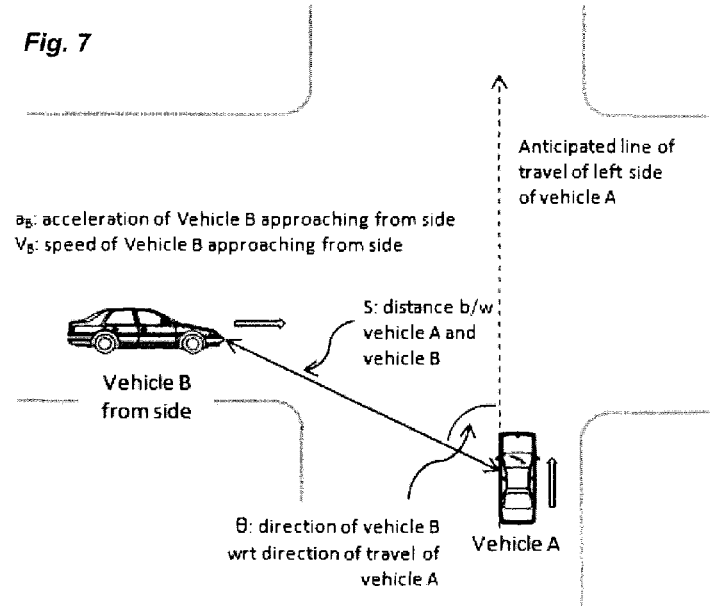
FIG. 7 depicts four measurements made by radar installed in Vehicle A.

FIG. 6 shows two vehicles at the point where they just recognized each other. From the left, let it be assumed that Vehicle B is entering the crosswalk traveling at 50 km/h (13.9 m/s). At this time, the free running distance and the braking distance are shown in Table 1. At the time when Vehicle B recognizes Vehicle A and passes the free running distance, the front part of the vehicle is predicted to be in IP-2b, as marked as 3.

TABLE 1

| Initial Speed of Approaching Vehicle B $V_B$(m/s) | Free running distance (m) | Braking distance (m) | Distance it takes to fully stop (m) |
|---|---|---|---|
| 13.9 | 14.0 | 12.0 | 26.0 |

Various widths of different areas of a crossroads are shown as follows (based on the rules regarding the structure and design of roads).

TABLE 2

| Sidewalk width (m) | Crosswalk width (m) | Car lane width (m) |
|---|---|---|
| 2.5 | 4.0 | 3.0 |

The distance from the left side of the crosswalk until the collision spot (IP-2a) is as shown in Table 3.

$L_{BX}$=the width of the sidewalk+the width of the car lane×(number of car lanes+0.5)

(note: because the distance is measured to the center of each collision spot in FIG. 6, 0.5 is added to the number of lanes).

TABLE 3

| $L_{BX}$ (the distance from the detection spot to the anticipated collision spot) (m) | | | | | |
|---|---|---|---|---|---|
| IP-3a | 13 | IP-3b | 16 | IP-3c | 19 |
| IP-2a | 13 | IP-2b | 16 | IP-2c | 19 |
| IP-1a | 13 | IP-1b | 16 | IP-1c | 19 |

Even assuming that the driver is able to sense danger, before he or she can brake on reaction, in other words, during one second of reaction time, Vehicle B travels 14 m (free running distance). This spot is 3 of IP-2b.

On the other hand, Vehicle A, after the green light is signaled, starts moving, crosses the crosswalk and approaches the crossroads, and only then recognizes the approaching Vehicle B. 1 and 2 in FIG. 6 represent the positions of Vehicle A due to free running distance after Vehicle A realizes the problem. Vehicle A travels approximately 6 m, passing the crosswalk and entering the crossroads, by the time the driver realizes the danger. When entering the crossroad, the speed ($V_A$) of Vehicle A is calculated by using the acceleration, the distance traveled, the final speed and the initial speed, via the formula $2 \times a \times S = V^2_{final} - V^2_{initial}$. Where, a equals acceleration (the rate of acceleration of Vehicle A starting to move at the stop line); S equals the distance travelled (approximately 6 m); $V_{final}$ equals the final speed ($V_A$ at which the vehicle enters the crossroads); and $V_{initial}$ equals the initial speed (0, because the car starts moving from the idling position).

Generally, when a car starts moving at the crossroads, it accelerates at 0.1 g (approximately 1 m/s$^2$) when driven gently and at 0.2 g (approximately 2 m/s$^2$) when driven aggressively, while "g" stands for a gravitational acceleration.

TABLE 4

| Classification | Acceleration (m/s$^2$) | $V_A$ (m/s) |
|---|---|---|
| Aggressive Acceleration 2 | 2 | 5.0 |
| Gentle Acceleration 1 | 1 | 3.5 |

The average reaction time of a driver (in other words, the amount of time it takes for a driver to notice a situation and react) is on average one second. During this time, there is almost no difference in the traveling speed of the vehicle.

After the reaction time (in other words, after 1 second) Vehicle A is at IP-1b or IP-2b, as shown in Table 5 (where $L_{AX}$ represents the distance travelled after one second).

TABLE 5

| Classification | $V_A$ (m/s) | $L_{AX}$(m) |
|---|---|---|
| Aggressive Acceleration 2 | 5.0 | 6.0 |
| Gentle Acceleration 1 | 3.5 | 4.05 |

As shown in Table 6, one second passes until the driver of Vehicle A notices the approaching Vehicle B and can take an appropriate action. By this time, Vehicle B is at location 3 and therefore a collision is unavoidable with Vehicle A, which is at location 1 or location 2.

Assuming the length of a sedan vehicle is 4.8 m, Table 6 shows the impact area.

TABLE 6

| Classification | Entire Vehicle (Length) | Front-side view mirror (engine compartment) | Side view mirror-rear wheel (passenger area) | Rear wheel-back (trunk area) |
|---|---|---|---|---|
| Unit (m) | 4.8 | 1.8 | 2.0 | 1.0 |

In case of location 2 involving aggressive acceleration, Vehicle A is impacted in the passenger area. In case of location 1 involving gentle acceleration, it is impacted in the engine compartment.

Figure 10:
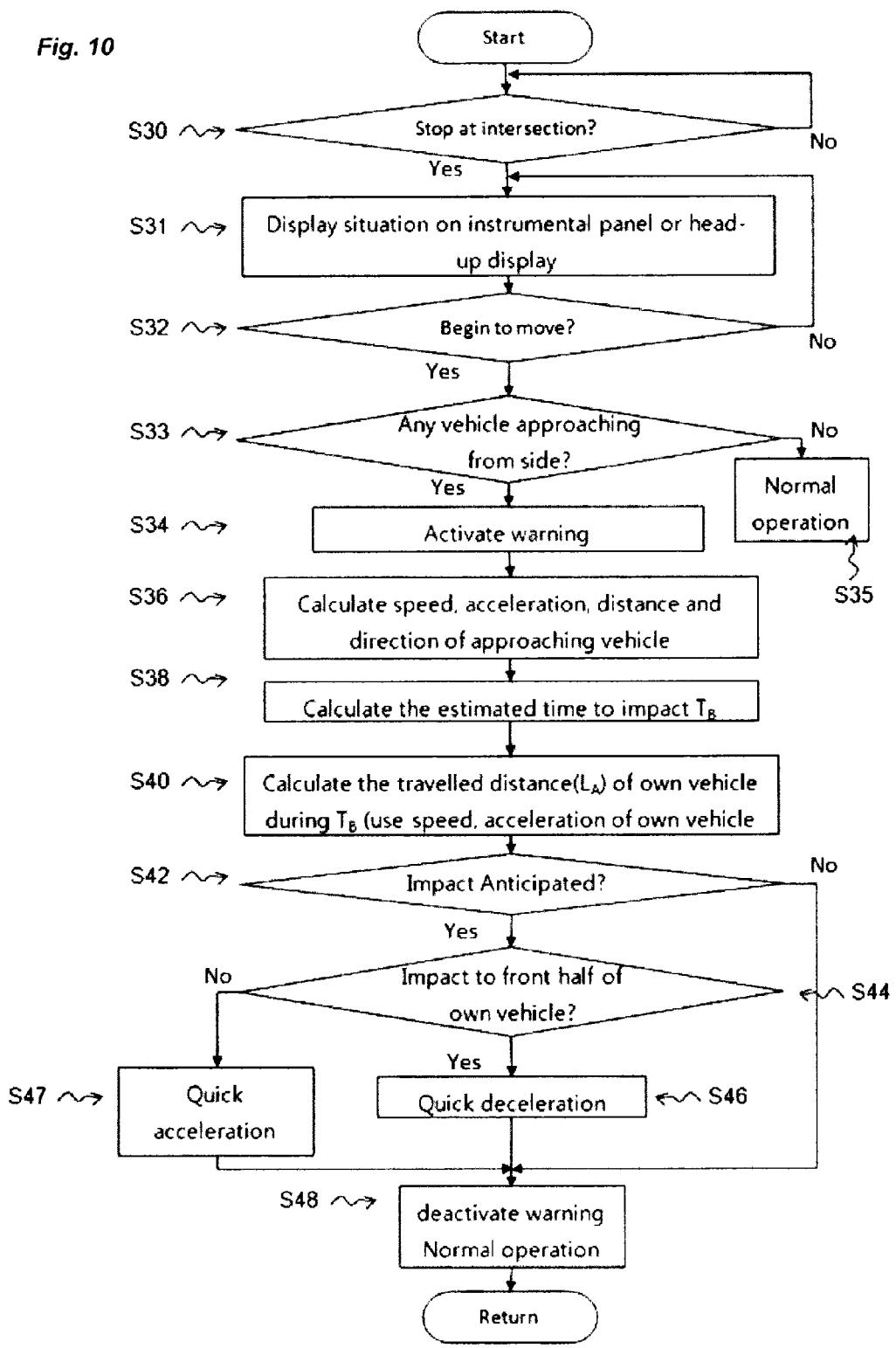
FIG. 10 depicts a flowchart showing how side collisions of vehicles are avoided by using the ideal embodiment of this invention.

It will be explained how the above-discussed formulas are measured and used by referring to FIGS. 6 and 10. First, by utilizing global positioning system (GPS) or other means, it determines whether Vehicle A is currently stopped at a crossroads S30, and waits for the traffic light to change. If it determines that the vehicle is stopped at a crossroads, the side collision avoidance system initiates operation and shows the crossroads situation on the display panel or heads-up display (direction of the crossroads, movements of vehicles passing through the crossroads etc.). S31 Afterwards, it determines whether Vehicle A started moving from the stop line behind the crosswalk. S32

If Vehicle A started moving, it determines whether there is any approaching Vehicle B from the side. S33. The approaching Vehicle B is detected by radar sensor 10 installed in Vehicle A. Radar sensor 10 sends a signal to the main control unit 30 such as the electronic control unit (ECU) regarding whether there is an approaching vehicle.

Figure 1:
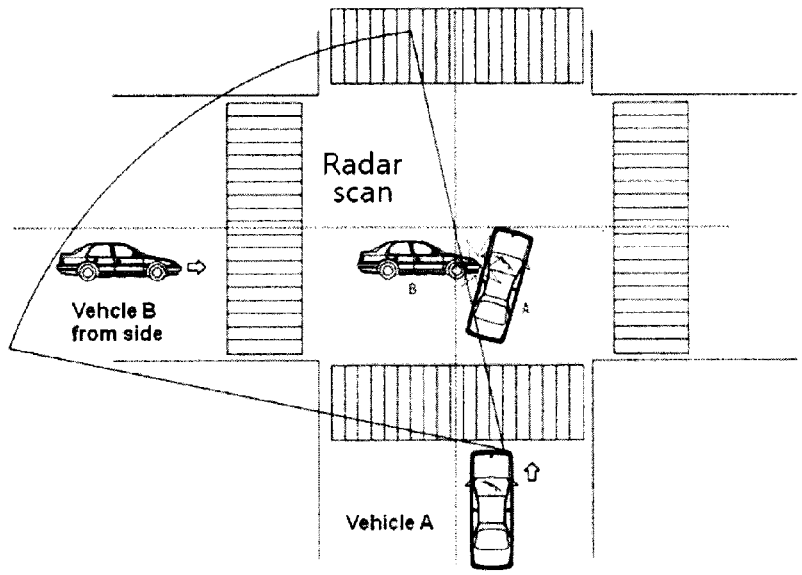
FIG. 1 depicts a typical collision that occurs at a crossroads.
Figure 2:
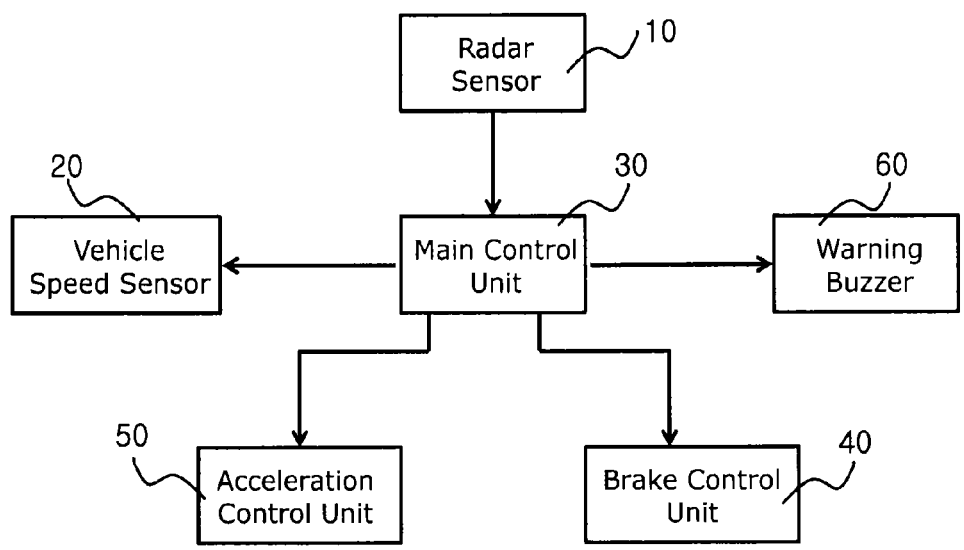
FIG. 2 depicts the operation of the conventional collision avoidance systems in the prior art.
Figure 3:
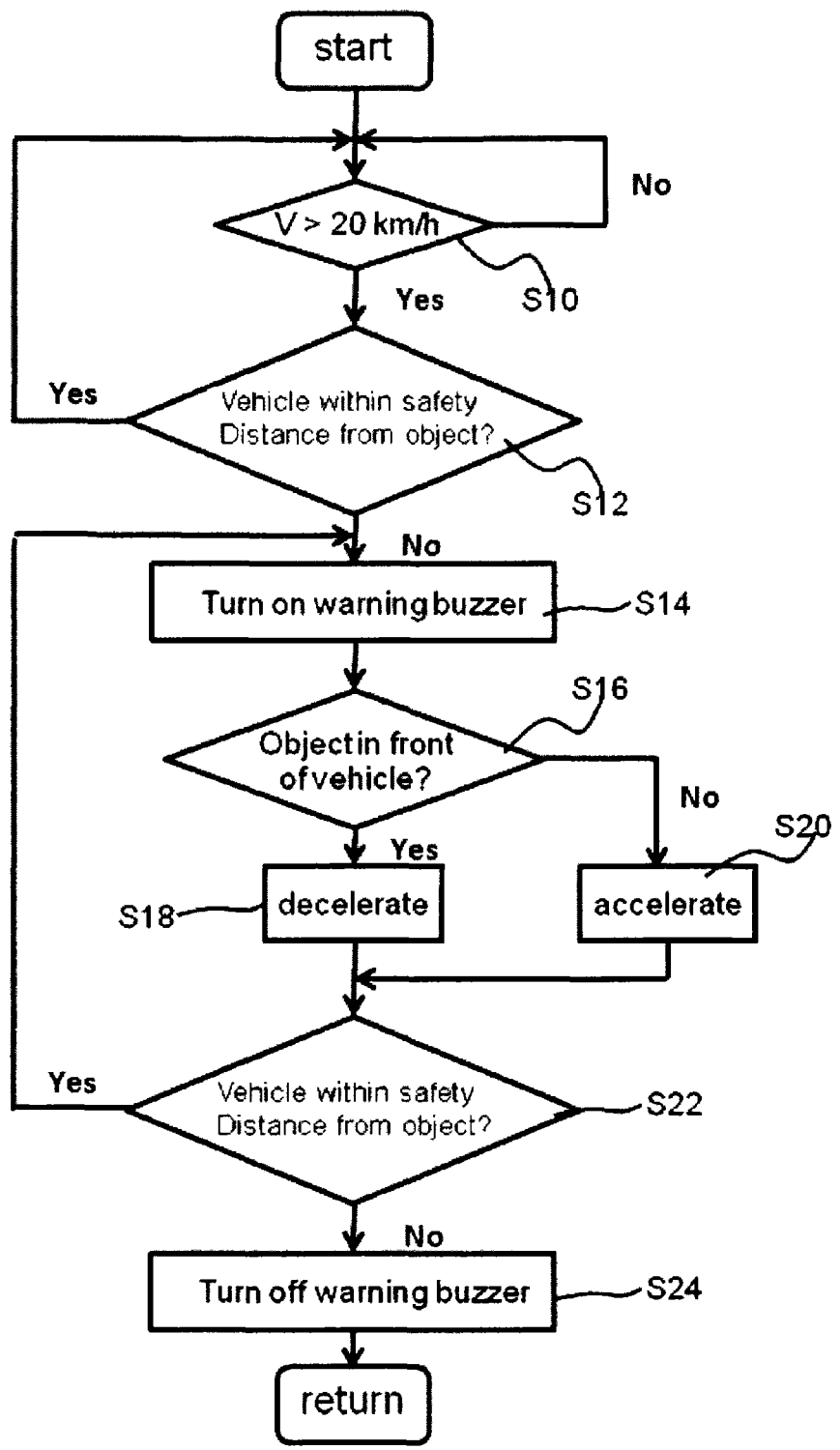
FIG. 3 depicts a flow chart describing the operation of the conventional collision avoidance systems.
Figure 4:
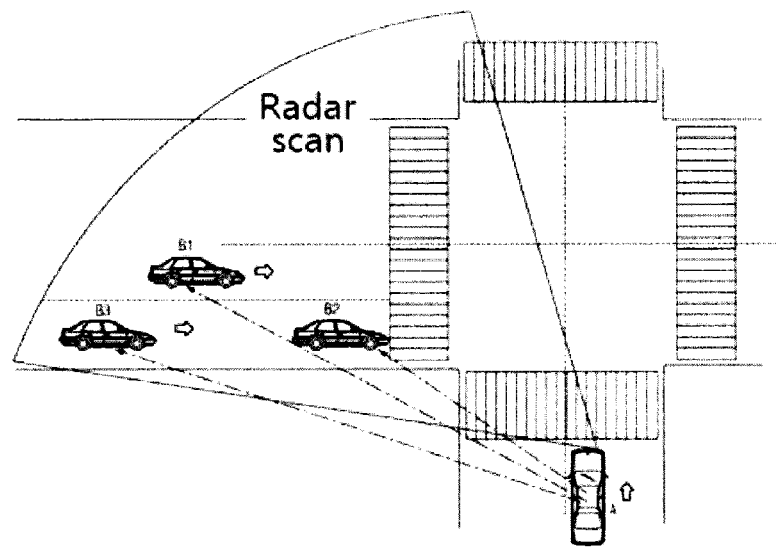
FIG. 4 depicts the approaching vehicle tracking logic of an embodiment of this invention.

As shown in FIG. 4, Vehicle B1 is recognized as an approaching vehicle because there is no car stopped at the stop line, and Vehicle B3 is disregarded because there is already a vehicle B2 that is stopped at the stop line. Accordingly, when there are multiple vehicles approaching, only those approaching vehicles that present a risk are traced and calculated, reducing the calculation load of the controller and improving the performance of the collision avoidance system.

If there is a Vehicle B approaching, the driver is given an alarm (audible warning), a warning light is turned on the display panel or heads-up display panel (visual warning), or steering wheel is vibrated (haptic warning) S34. If there is no Vehicle B approaching, Vehicle A may operate in a usual manner S35.

From the radar sensor installed in Vehicle A, the speed ($V_B$), acceleration ($a_B$), distance from Vehicle A (S) and the direction (θ) of Vehicle B are measured and transmitted to ECU S36. Measuring the above four factors is possible if a radar sensor suitable to detect an approaching vehicle at crossroads is utilized.

Figure 8:
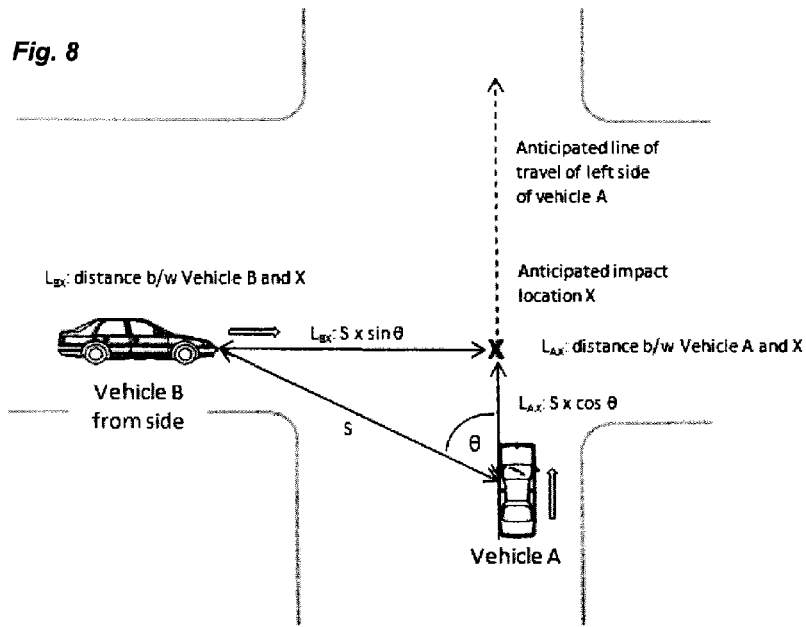
FIG. 8 depicts how the distance between each vehicle from the anticipated collision location is calculated by measuring the distance from Vehicle A and using trigonometry.

As shown in FIG. 8, using trigonometry, the distance ($L_{BX}$), which represents the distance from the front of Vehicle B to the anticipated collision location (X), and the distance ($L_{AX}$), which represents the distance of the center of Vehicle A at the time when Vehicle B is detected to the anticipated collision location (X), are calculated. If the collision is substantially perpendicular in nature, as shown in FIG. 8, the abovementioned direction (θ) is the angle between of the location of Vehicle B and the driving direction of Vehicle A.

The distance ($L_{AX}$), which represents the distance between Vehicle A at the time when Vehicle B is detected and the anticipated collision location (X) is calculated via S×cos θ. The distance ($L_{BX}$), representing the distance between the location where Vehicle B is detected and the anticipated collision location (X) is calculated via S×sin θ.

After using the distance of each vehicle to the anticipated collision location (X) by using trigonometry, by using the formula below, the time ($T_B$) it takes for Vehicle B to reach the anticipated collision location is calculated S38 according to the formula: $L_{BX}=V_B \times T_B + \frac{1}{2} \times a_B \times T_B^2$ (solving for $T_B$). Once the time ($T_B$) is calculated, the distance ($L_A$) travelled by Vehicle A during the time ($T_B$) is calculated S40 according to the formula: $L_A=V_A \times T_B + \frac{1}{2} \times a_A \times T_B^2$. $V_A$ and $a_A$ are the speed and the acceleration of Vehicle A as measured and calculated by the vehicle sensor 20.

Accordingly, from the time ($T_B$), distance ($L_{AX}$) and distance ($L_A$), it is determined whether Vehicle B will collide with Vehicle A S42. The collision determination is based on the whether the difference between $L_A$ and $L_{AX}$ is greater than the entire length of Vehicle A (1). If it is determined that the difference between $L_A$ and $L_{AX}$ is greater than the length of Vehicle A, then Vehicle A does not come into contact with Vehicle B. To put it more precisely, in order to avoid a collision, $L_A - L_{AX}$ must be greater than half of the length of Vehicle A (1)+half of the width of Vehicle B.

Figure 9:
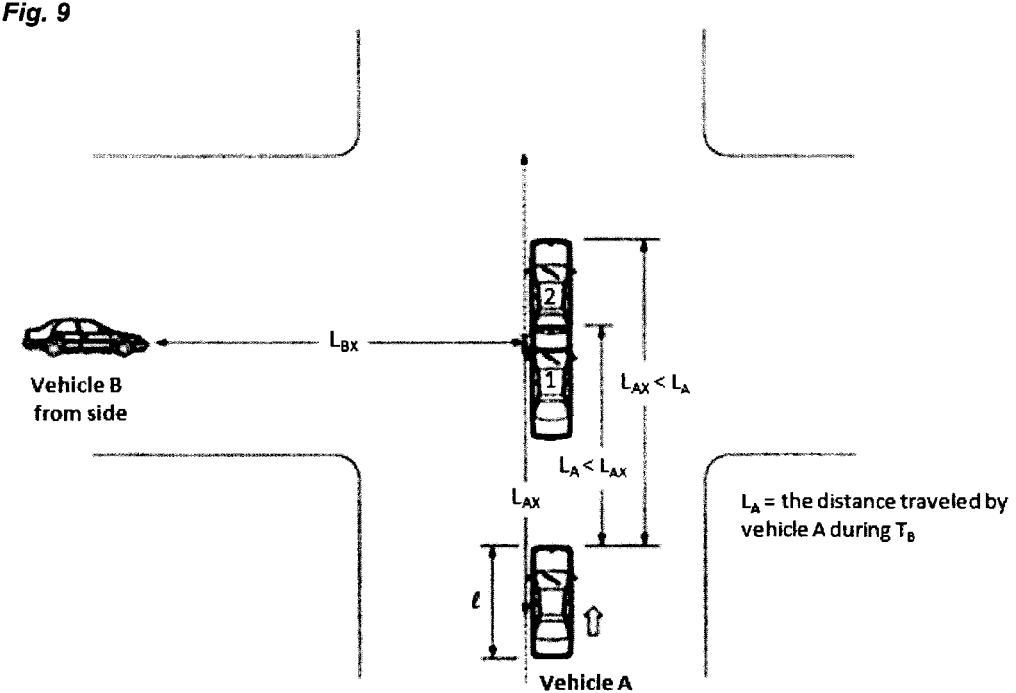
FIG. 9 depicts how the collision figures are calculated by the figures measured using radar.

If it is determined that there will be a collision, it then determines which area of Vehicle A will be impacted by Vehicle B S44. In other words, if, as shown in FIG. 9, the difference between $L_A$ and $L_{AX}$ is shorter than the length of Vehicle A (1), Vehicle A and Vehicle B will collide. If $L_A < L_{AX}$, the front half of Vehicle A will be the impact area, meaning that rapid deceleration is called for S46; if $L_A > L_{AX}$, the rear half of Vehicle A will be the impact area, meaning that rapid acceleration is called for S47.

The rapid acceleration of Vehicle A is controlled by the accelerator controller 50 of ECU 30, and the rapid deceleration of Vehicle A is controlled by the brake system controller 40 of ECU 30.

Figure 11:
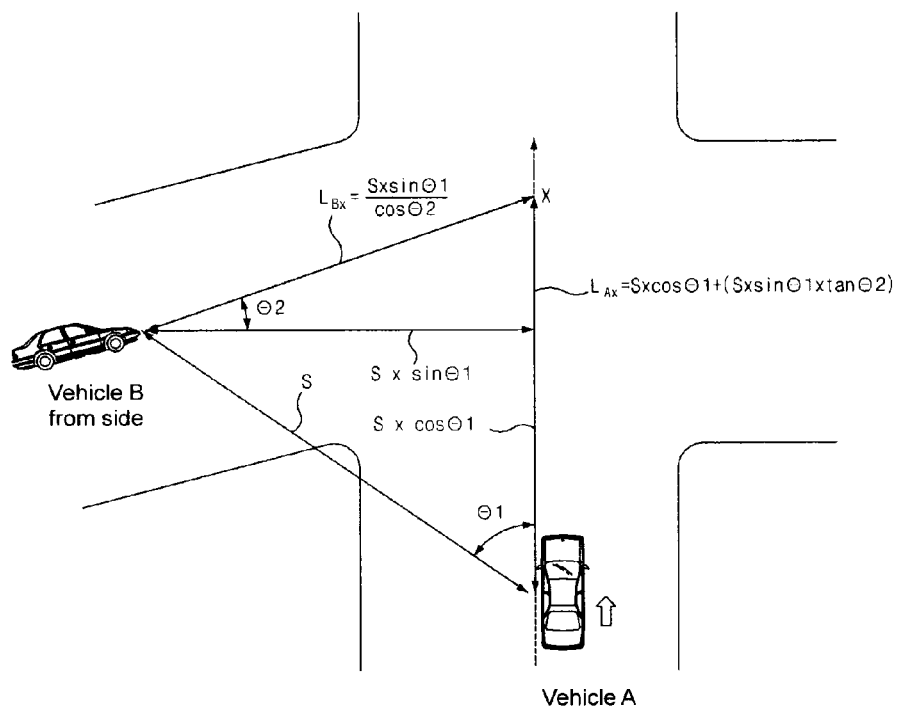
FIG. 11 depicts how the distance of each vehicle from the anticipated collision location is calculated in non-perpendicular collision situations.

Further referring to FIG. 11, in case of oblique side collision, the direction (θ) equals the direction ($θ_1$), which represents the angle of the approaching Vehicle B with respect to the travelling direction of Vehicle A, and the angle ($θ_2$) represents the direction of the approaching vehicle B's deviation from the perpendicular direction with respect to the travelling direction of vehicle A.

Then, the distance ($L_{AX}$), representing the distance between the location of Vehicle A at the time when Vehicle B is detected and the anticipated collision location (X) is calculated via S×cos $θ_1$+(S×sin $θ_1$×tan $θ_2$), and the distance ($L_{BX}$), representing the distance between the detection point of Vehicle B and the anticipated collision location (X) is calculated via S×sin $θ_1$/cos $θ_2$.

By entering these calculated values into the above formulas, the time ($T_B$) and the distance ($L_A$) are obtained, thereby providing information on where the impact area will be, and the vehicle can be rapidly accelerated or decelerated as necessary.

The above description is merely one embodiment of this invention, which is a method for avoiding side collisions of vehicles. This invention is not limited to the above embodiment. Within the claims below, without going outside the scope of this invention, it will be possible to embody the invention in many different ways by people with general knowledge of the field to which this invention belongs.

What is claimed is:

1. A method for avoiding a side collision of vehicles comprising:
    using a location means configured to determine whether a Vehicle A is stopped at a crossroad;
    displaying the crossroad on a display if Vehicle A is stopped at the crossroad;
    using one or more vehicle sensors configured to determine whether Vehicle A has started moving;
    using a radar sensor configured to determine whether there is a Vehicle B approaching the side of Vehicle A if Vehicle A has started moving;
    activating a warning system which warns a driver of Vehicle A if Vehicle B is approaching;
    using a main control unit and input from the one or more vehicle sensors and the radar sensor to predict a collision spot (X);
    using the main control unit to calculate a time ($T_B$) it takes for Vehicle B to reach the collision spot (X) based on Vehicle B's measured speed ($V_B$), acceleration ($a_B$), distance from Vehicle A (S), and direction (θ);
    using the main control unit to calculate a distance travelled by Vehicle A ($L_A$) during time ($T_B$) based on the Vehicle A's measured speed ($V_A$) and acceleration ($a_A$);
    using the main control unit to determine whether Vehicle B will collide with Vehicle A by using the distance ($L_A$) and the time ($T_B$);
    using the main control unit to determine whether Vehicle B will collide with the front half of Vehicle A using the time ($T_a$) and the distance ($L_A$);
    using a brake control unit configured to decelerate Vehicle A rapidly if it is determined that there will be a collision with the front half of Vehicle A;
    using an acceleration control unit configured to accelerate Vehicle A rapidly if it is determined that there will not be a collision with the front half of Vehicle A;
    turning off the warning system and discontinuing abovementioned acceleration or deceleration after a collision between Vehicle A and Vehicle B is avoided.

2. The method for avoiding a side collision of vehicles as recited in claim 1, wherein:
    the direction (θ) represents the angle between the location of Vehicle B when detected and Vehicle A's direction of movement when the collision is to occur at a substantially perpendicular angle;
    the distance ($L_{AX}$), representing the distance between the location of Vehicle A at the time when Vehicle B is detected and the collision spot (X), is calculated via S×cos θ; and
    the distance ($L_{BX}$), representing the distance between the point where Vehicle B is detected and the collision spot (X), is calculated via S×sin θ.

3. The method for avoiding a side collision of vehicles as recited in claim 1, wherein:

the direction (θ) equals angle ($θ_1$), which represents the angle between the location of Vehicle B when detected and Vehicle A's direction of movement, and angle ($θ_2$) represents the angle between Vehicle B's direction of movement and a line perpendicular to Vehicle A's direction of movement if the collision is to occur at a non-perpendicular angle;

the distance ($L_{AX}$), representing the distance between the location of Vehicle A at the time when Vehicle B is detected and the collision spot (X), is calculated via $S×\cos θ_1+(S×\sin θ_1×\tan θ_2)$; and the distance ($L_{BX}$), representing the distance between the point where Vehicle B is detected and the collision spot (X), is calculated via $S×\sin θ_1/\cos θ_2$.

4. The method for avoiding a side collision of vehicles as recited in claim 2, further comprising:

calculating the time ($T_B$), which represents the time Vehicle B takes to travel from the point where Vehicle B is detected it to the collision spot (X), via $L_{BX}=V_B×T_B+½×a_B×T_B^2$; and calculating the distance ($L_A$), which represents the distance travelled by Vehicle A during the time ($T_B$), via $L_A=V_A×T_B+½×a_A×T_B^2$.

5. The method for avoiding a side collision of vehicles as recited in claim 3, further comprising:

calculating the time ($T_B$), which represents the time Vehicle B takes to travel from the point where Vehicle B is detected it to the collision spot (X), via $L_{BX}=V_B×T_B+½×a_B×T_B^2$; and calculating the distance ($L_A$), which represents the distance travelled by Vehicle A during the time ($T_B$), via $L_A=V_A×T_B+½×a_A×T_B^2$.

6. The method for avoiding a side collision of vehicles as recited in claim 4, further comprising:

determining whether the collision between Vehicle A and Vehicle B is unavoidable by determining if the difference between $L_A$ and $L_{AX}$ is shorter than the length of Vehicle A; and if the collision is unavoidable, rapidly decelerating if $L_A<L_{AX}$, or rapidly accelerating if $L_A>L_{AX}$.

7. The method for avoiding a side collision of vehicles as recited in claim 5, further comprising:

determining whether the collision between Vehicle A and Vehicle B is unavoidable by determining if the difference between $L_A$ and $L_{AX}$ is shorter than the length of Vehicle A; and if the collision is unavoidable, rapidly decelerating if $L_A<L_{AX}$, or rapidly accelerating if $L_A>L_{AX}$.

* * * * *